Feb. 3, 1931. J. STEINBERG 1,791,293
EMERGENCY TIRE
Filed Feb. 9, 1928
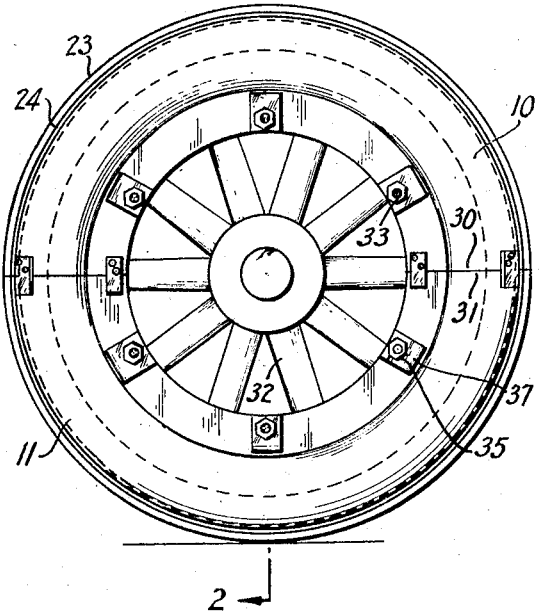
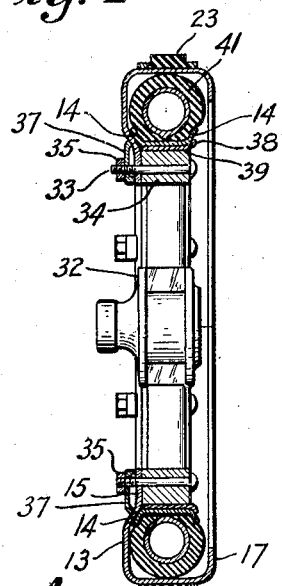
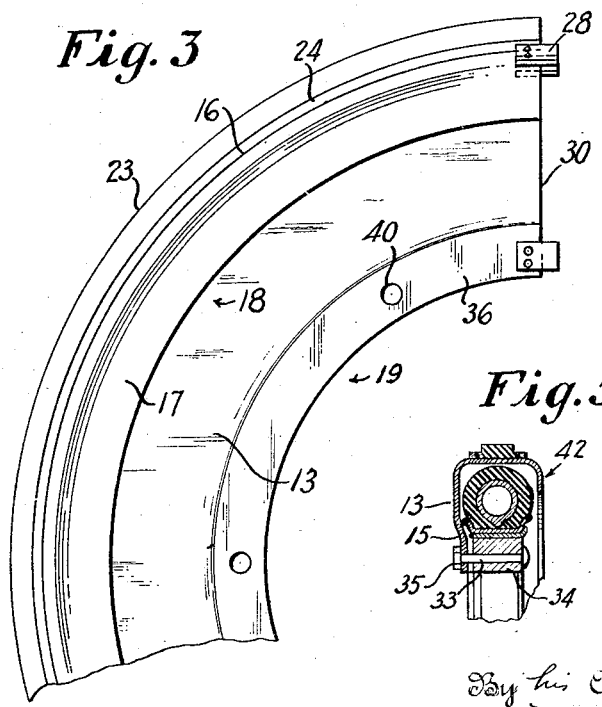
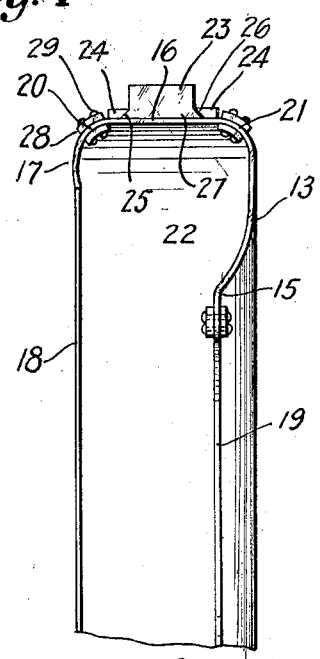
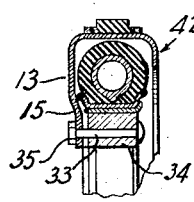
Inventor
Jacob Steinberg
By his Attorney Patented Feb. 3, 1931

1,791,293

UNITED STATES PATENT OFFICE

JACOB STEINBERG, OF BROOKLYN, NEW YORK

EMERGENCY TIRE

Application filed February 9, 1928. Serial No. 252,951.

This invention relates to emergency tires of the type designed to assume the load ordinarily placed on the pneumatic tire of a vehicle, should said tire become deflated or injured to such an extent that progress thereon is inadvisable.

My invention contemplates the provision of means for encompassing the deflated tire without removing said tire, and further contemplates the provision of means by which the tire encompassing device which constitutes the emergency tire may be quickly and easily secured to a wheel of the usual type. The emergency tire may further be provided with an auxiliary resilient tread arranged radially outside of the pneumatic tire, and adapted to take the load of the wheel, entirely independently of the pneumatic tire. By reason of its peculiar construction, my improved device has the additional function of a tire cover for preventing the access of light and air to the spare tire usually carried on an automobile. It may be carried in the usual tire rack when used as a tire cover, whether a spare tire is enclosed therein or not.

Among the objects of the invention is the provision of a practical emergency tire of the character and for the purposes described, which shall be simple in construction, comparatively cheap to manufacture, capable of quick and easy attachment to and removal from the wheel with pneumatic tire, without requiring any additional securing means, and shall be efficient in operation to a high degree.

Other objects of this invention will in part be obvious and in part hereinafter pointed out.

The invention accordingly consists in the features of construction, combinations of elements and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevation showing my improved emergency tire in operative position on a wheel;

Fig. 2 is a vertical section taken on the line 2—2 of Fig. 1;

Fig. 3 is an enlarged fragmentary elevation of the emergency tire device;

Fig. 4 is a fragmentary end view of the same; and

Fig. 5 is a vertical section, similar to Fig. 2, of a modified form of my invention.

Referring in detail to the drawing, the emergency tire embodying my invention there illustrated is made preferably in at least two similar sections 10 and 11. Each of said sections is preferably, though not necessarily, made of sheet metal bent into semi-circular form. If desired, the sections may of course be cast. The cross-sectional shape of each of said sections is substantially that of an L. The continuous flange 13 forming one leg of the L, is preferably curved towards the inside thereof at a point designed to correspond substantially to the position of the usual tire rim 14 when the emergency tire is in place, a depression 15 being thus formed in the flange 13 to abut against said tire rim. The outermost face 16 of the section is preferably made cylindrical in shape, and terminates in a substantially perpendicular extension or flange 17 also continuous with and of less width than the flange 13. The circular opening 18, bounded by the peripheral edge of the extension 17, is thereby made preferably of considerably greater diameter than the opening 19 bounded by the peripheral edge of the flange 13. The rounded corner 20 joints the extension 17 to the outermost face 16 while the similar rounded corner 21 joints the face 16 to the flange 13, whereby a well braced, rigid and unitary structure is provided.

It will be seen that a space 22 is provided on the inside of each of the sections 10 and 11, which space is designed for the reception of the pneumatic tire 41. A resilient tread 23 may be suitably held in place on the face 16 preferably by tread holding strips 24 provided and arranged symmetrically about the middle of, and on the face 16. Each of said strips may be formed with inclined sides 25, whereby a dovetail groove 26 is provided therebetween for the reception of the base 27 of the tread. When the sections are made of sheet material, the strips 24 may be suitably secured to the face 16 but if the sections are cast, then the strips 24 may be integrally cast therein. Said tread 23 may be molded directly into the groove 26 or forced thereinto in a practical manner.

For aiding in maintaining the sections 10 and 11 in proper operative relation, I prefer to secure a plurality of pairs of guide strips 28 to one of the sections such as 10 as by means of suitable rivets 29, one of said guide strips being arranged on the outside of the section and the other oppositely arranged on the inside of the section. Each of the strips 28 however, projects past the terminal edge 30 of the section a sufficient distance to provide a suitable groove between each pair of said strips for the reception of the terminal portion 31 of the section 11, whereby said sections when assembled are arranged in their proper positions.

If desired, suitable means may be provided on the guide strips 28 of the terminal portion 31 whereby the sections 10 and 11 may be releasably secured to each other in proper relation at their terminal portions 30 and 31.

In order to maintain my improved tire in place on a wheel as 32 of the usual type, I prefer to make use of the bolts 33 passing through the usual felly 34 and provided at one end with nuts 35. For this purpose, suitably spaced perforations 40 are provided in the innermost portion 36 of each of the sections 10 and 11. As illustrated, particularly in Figs. 1 and 2, each of the sections is maintained in proper position by means of the conventional rim lugs 37 arranged on the bolts 33 and normally urging the tire rim 14 against the flange 38 of the usual wheel rim 39.

In order to arrange my improved tire in place, the nuts 35 are removed from their bolts as are the rim lugs 37. One of the sections as 10 is then placed over the upper half of the pneumatic tire 41 which thereby enters the space 22, while the ends of the bolts 33 are passed through the corresponding perforations 40. The rim lugs 37 and the nuts 35 are then replaced, whereby the section is securely attached to the wheel and the tire rim simultaneously secured. To cover the lower half of the tire 41, it is not necessary to jack up the vehicle, since the vehicle may merely be pushed forward about a one-half revolution of the wheel so that the attached section rests on the ground. The remaining section is then placed over the uncovered portion of the tire 41 in a similar manner, the terminal edge 31 thereof entering the space between the guide strips 28 being guided thereby into proper position. The rim lugs and nuts are replaced in the same manner and the vehicle is ready to proceed.

In the modification illustrated in Fig. 5, the depression 15 in the face 13 of the emergency tire 42 is not quite so pronounced as in the form just described. It thereby becomes possible to dispense with the rim lugs 37 since one side of the emergency tire serves to maintain the tire rim 14 in its proper place. It will be seen that I have provided means entirely independent of the pneumatic tire for taking the load on the wheel while the pneumatic tire is entirely unstressed. It will further be seen that the tread 16 is loaded along the line passing through the center of the pneumatic tire so that the position and direction of the load on the emergency tire remains unchanged. Furthermore, by reason of the peculiar shape of my device and the provision of the space 22, the pneumatic tire 41 is adequately protected. For this reason it will be obvious that my device may also be used as a tire cover when it is not used as an emergency tire.

The device may be quickly and easily attached with little loss of time and requires no expert manipulation nor change in the present types of wheel structures. It will further be seen that my improved device is entirely independent of the usual pneumatic tire and that said pneumatic tire in no way interferes with the attachment of my device to the wheel; that the surface 16 in the operative position thereof is arranged in predetermined spaced relation to both the wheel and the pneumatic tire so that no weight is placed on the pneumatic tire; that the conventional rim securing nuts and bolts may be used to secure the emergency tire on the pneumatic tire rim to the wheel simultaneously, and that the flanges 13 and 17 serve as reinforcing members as well so as to provide a spacer and securing means for the tread.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. In combination, a wheel, a tire rim on said wheel, a pneumatic tire on said rim, an emergency tire superimposed over said tire having a cushion tread portion, and means for simultaneously securing said tire rim and emergency tire to the wheel, said means including a rim lug mounted on said wheel for pressing a portion of said emergency tire against said tire rim.

2. In combination, a wheel having a felly, a tire rim on said wheel, a pneumatic tire on said rim, an emergency tire superimposed over said pneumatic tire and means for simultaneously securing said tire rim and emergency tire to the wheel, said emergency tire comprising a pair of semi-circular sections, one of said sections having a pair of spaced extensions adapted to receive an edge portion of said other section therebetween for aligning said other section, said sections having portions adapted to contact one side of the wheel and outer curved portions normally spaced from and adapted to substantially encompass said pneumatic tire, said securing means including bolts extending thru said felly, rim lugs on said bolts and nuts on said bolts adapted to cooperate with said lugs for forcing a portion of the emergency tire against said tire rim.

In testimony whereof I affix my signature.

JACOB STEINBERG.